US010889301B2

(12) United States Patent
Jung

(10) Patent No.: US 10,889,301 B2
(45) Date of Patent: Jan. 12, 2021

(54) METHOD FOR CONTROLLING VEHICLE AND INTELLIGENT COMPUTING APPARATUS FOR CONTROLLING THE VEHICLE

(71) Applicant: LG ELECTRONICS INC., Seoul (KR)

(72) Inventor: Younghan Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/567,306

(22) Filed: Sep. 11, 2019

(65) Prior Publication Data

US 2020/0001883 A1 Jan. 2, 2020

(30) Foreign Application Priority Data

Jun. 14, 2019 (KR) ........................ 10-2019-0071041

(51) Int. Cl.

| | |
|---|---|
| ***B60W 40/09*** | (2012.01) |
| ***G06K 9/00*** | (2006.01) |
| ***B60W 50/14*** | (2020.01) |
| ***B60Q 1/34*** | (2006.01) |
| ***B60J 3/02*** | (2006.01) |
| ***B60K 35/00*** | (2006.01) |

(52) U.S. Cl.

CPC ............ *B60W 40/09* (2013.01); *B60J 3/0204* (2013.01); *B60K 35/00* (2013.01); *B60Q 1/34* (2013.01); *B60W 50/14* (2013.01); *G06K 9/00604* (2013.01); *G06K 9/00845* (2013.01); *B60K 2370/146* (2019.05); *B60K 2370/148* (2019.05); *B60W 2050/146* (2013.01)

(58) Field of Classification Search

None

See application file for complete search history.

(56) References Cited

U.S. PATENT DOCUMENTS

| | | | | |
|---|---|---|---|---|
| 7,394,393 | B2 * | 7/2008 | Zhang .................. | B60W 40/09 340/573.1 |
| 7,519,459 | B2 * | 4/2009 | Ito ............................ | B60R 1/00 340/425.5 |
| 8,280,588 | B2 * | 10/2012 | Inou ...................... | B60W 10/20 701/300 |
| 9,043,042 | B2 * | 5/2015 | Kalhous ................. | G06F 3/013 701/1 |
| 9,646,509 | B2 * | 5/2017 | Welles .................. | G09B 9/052 |

* cited by examiner

*Primary Examiner* — K. Wong

(74) *Attorney, Agent, or Firm* — Birch, Stewart, Kolasch & Birch, LLP

(57) ABSTRACT

Disclosed are a vehicle control method and an intelligent computing apparatus for controlling a vehicle. By obtaining action information of a driver, when a change in a gaze of a driver is recognized, displaying an image related to a direction different from a direction of the changed gaze of the driver through a display related to the direction of the gaze of the driver when a change in a gaze of a driver is recognized, it is possible to effectively assist the driver in driving by providing a lot of information related to a driving obstacle factor, and the driver can easily observe the information related to the driving obstacle factor. At least one of a vehicle, a user equipment, and a server of the present disclosure may be associated with an artificial intelligence module, a robot, an augmented reality (AR) device, a virtual reality (VR) device, and a device related to a 5G service.

20 Claims, 17 Drawing Sheets

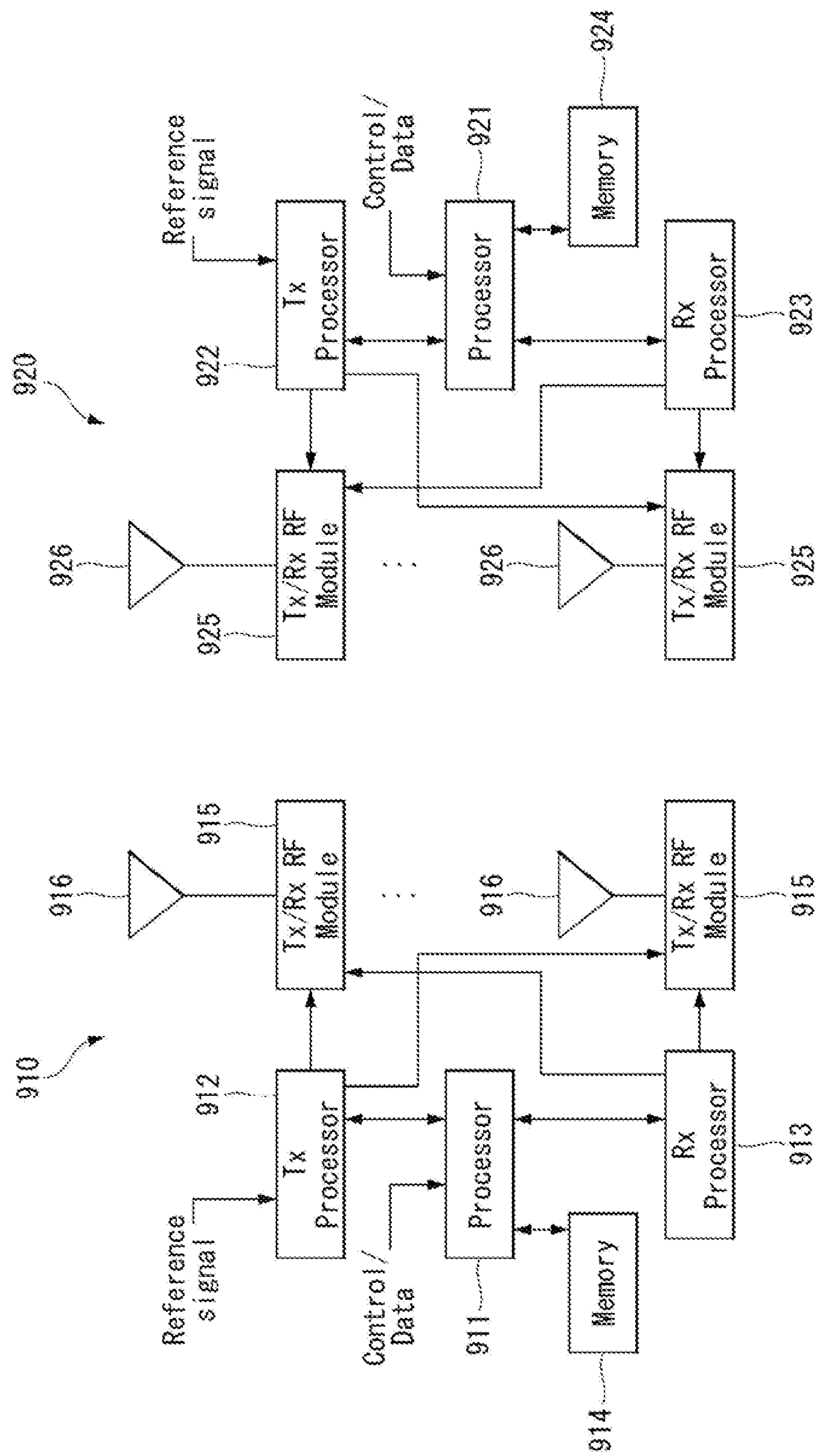
【FIG. 1】

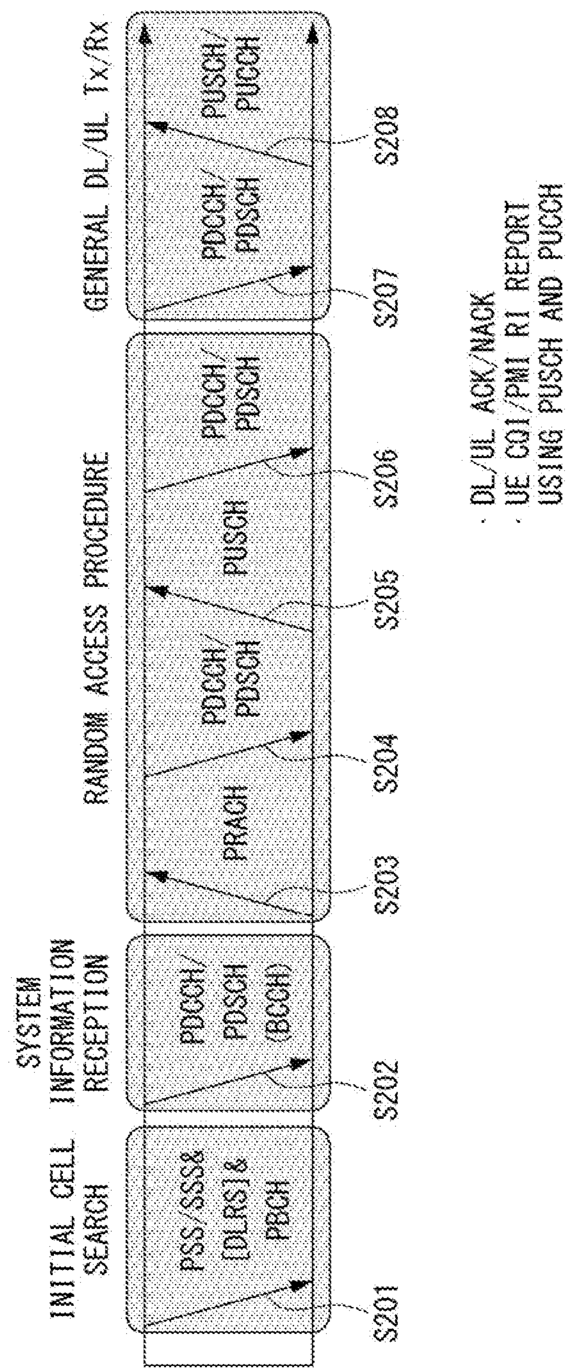
【FIG. 2】

【FIG. 3】
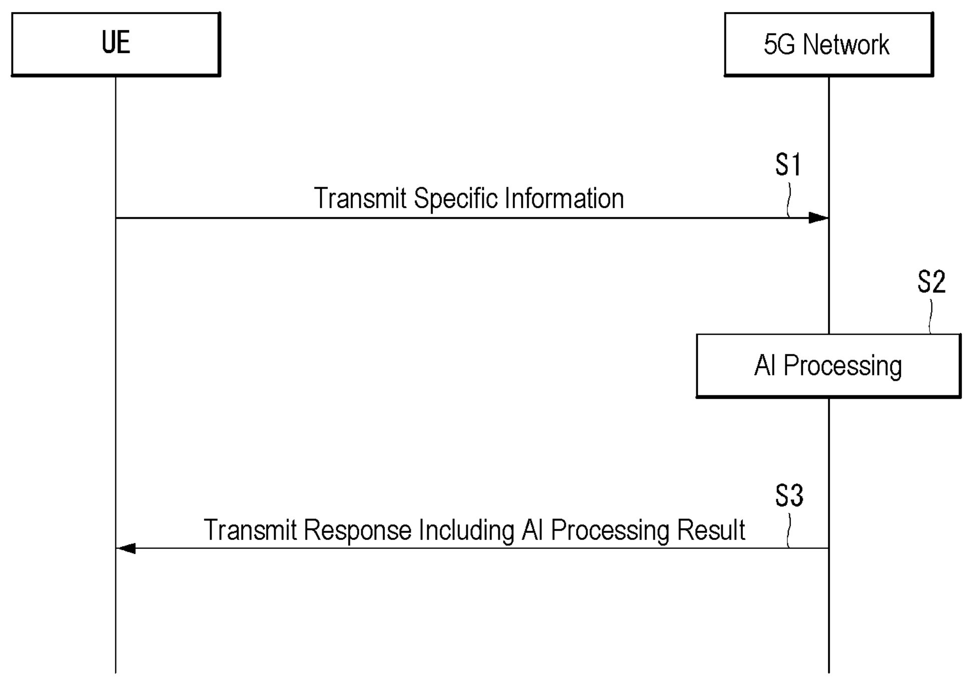

【FIG. 4】
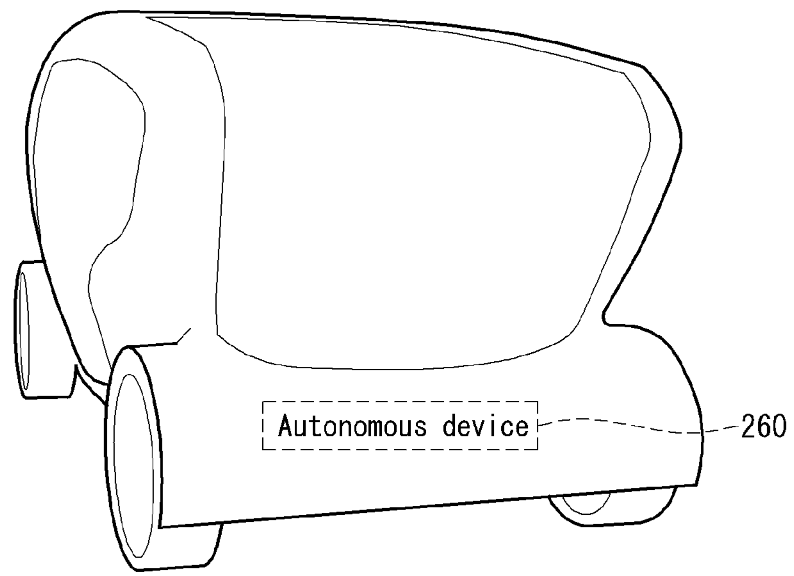
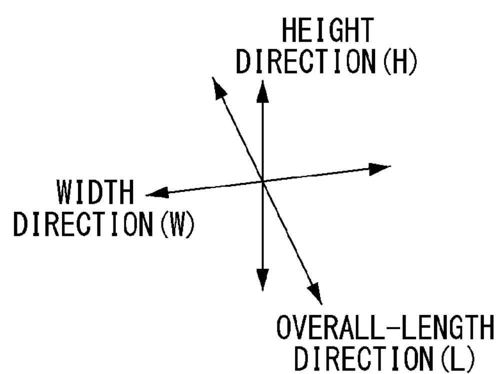

【FIG. 5】
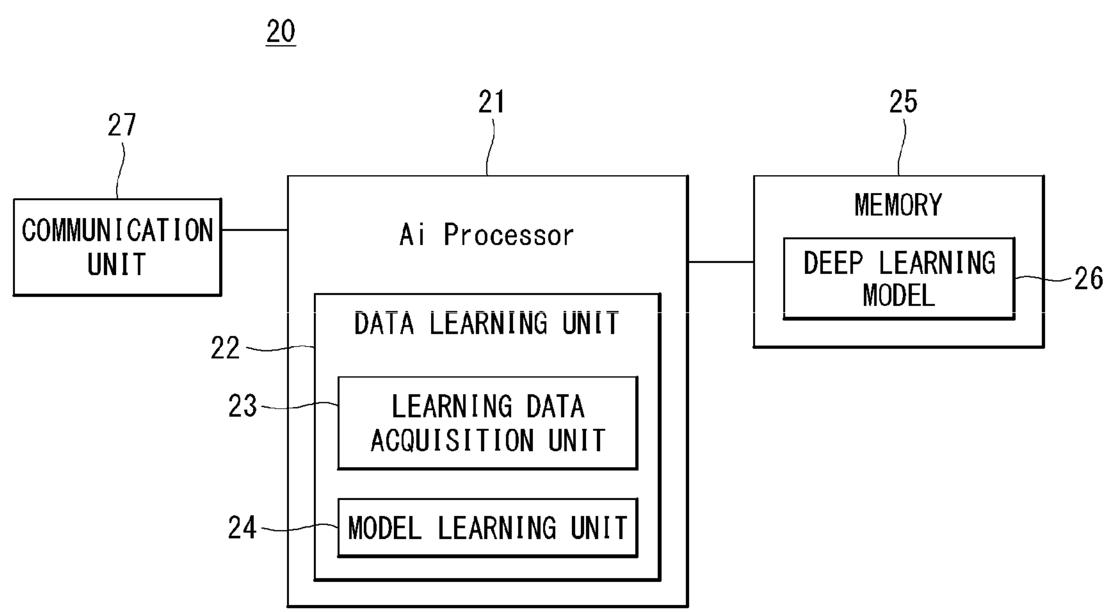

【FIG. 6】
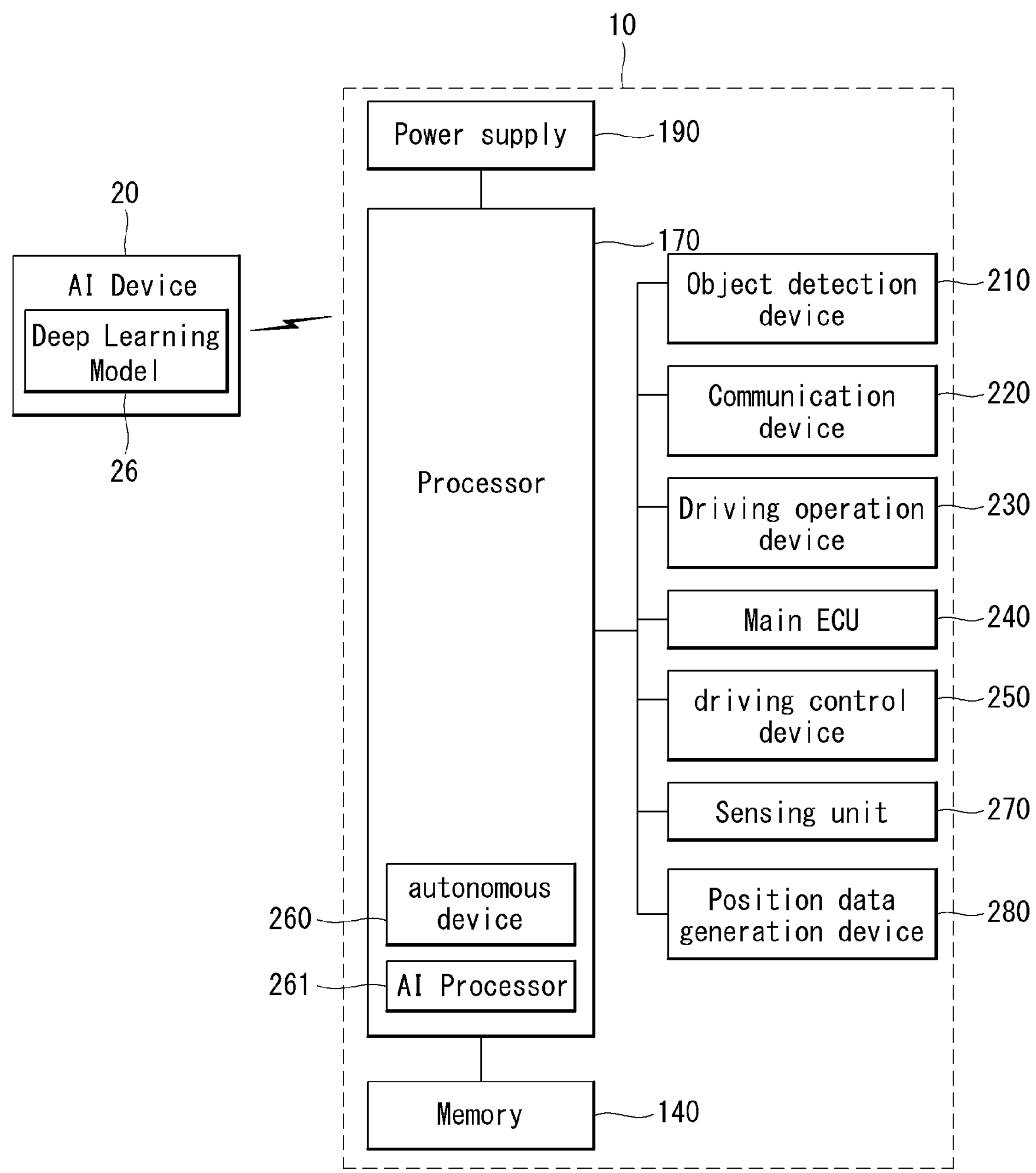

【FIG. 7】
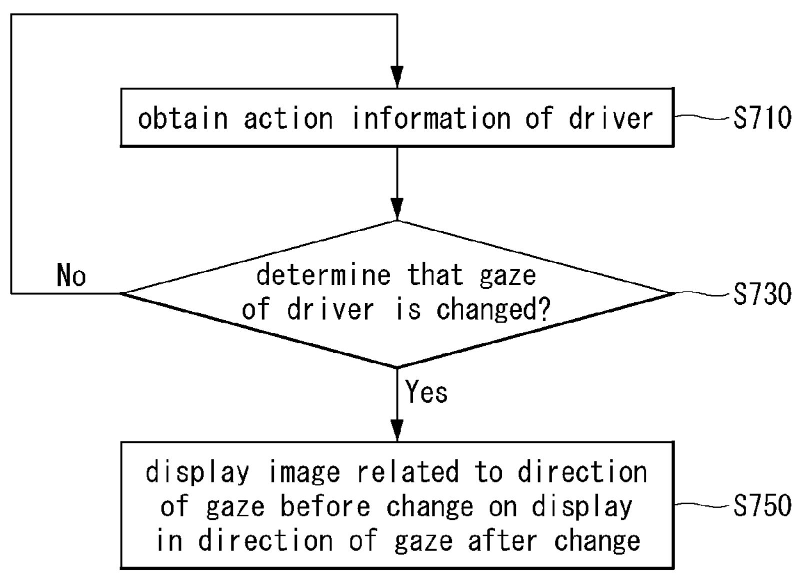

【FIG. 8】
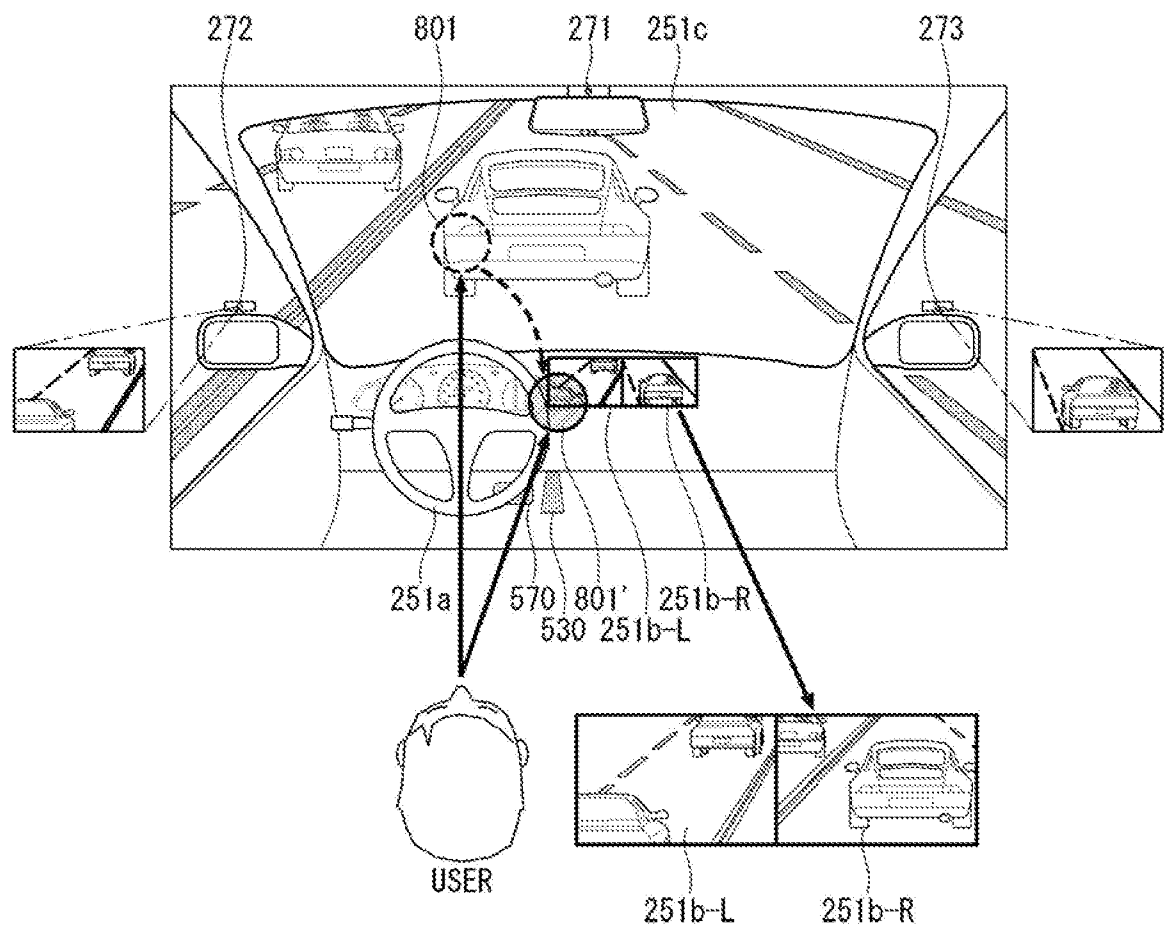

【FIG. 9】
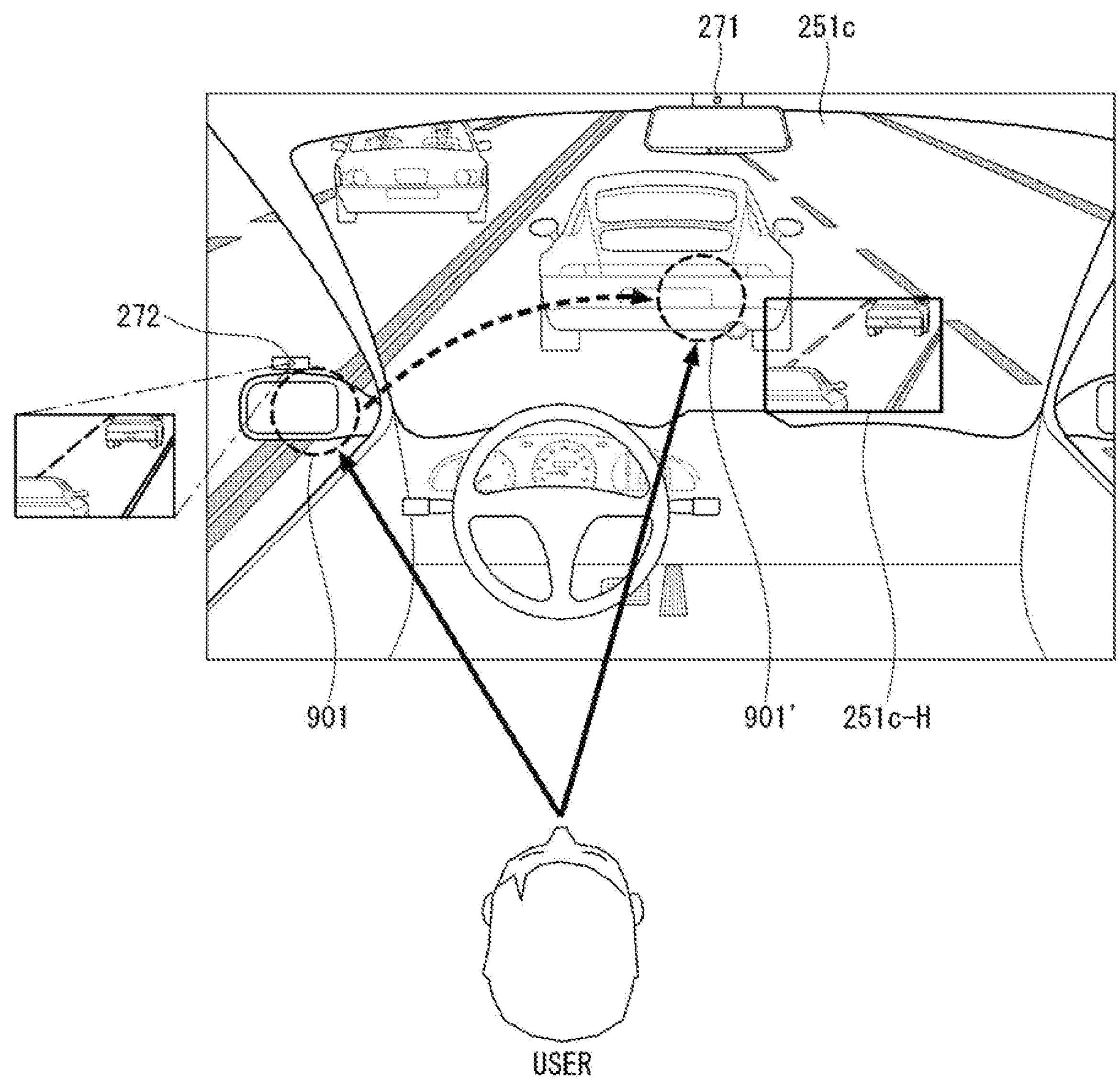

【FIG. 10】
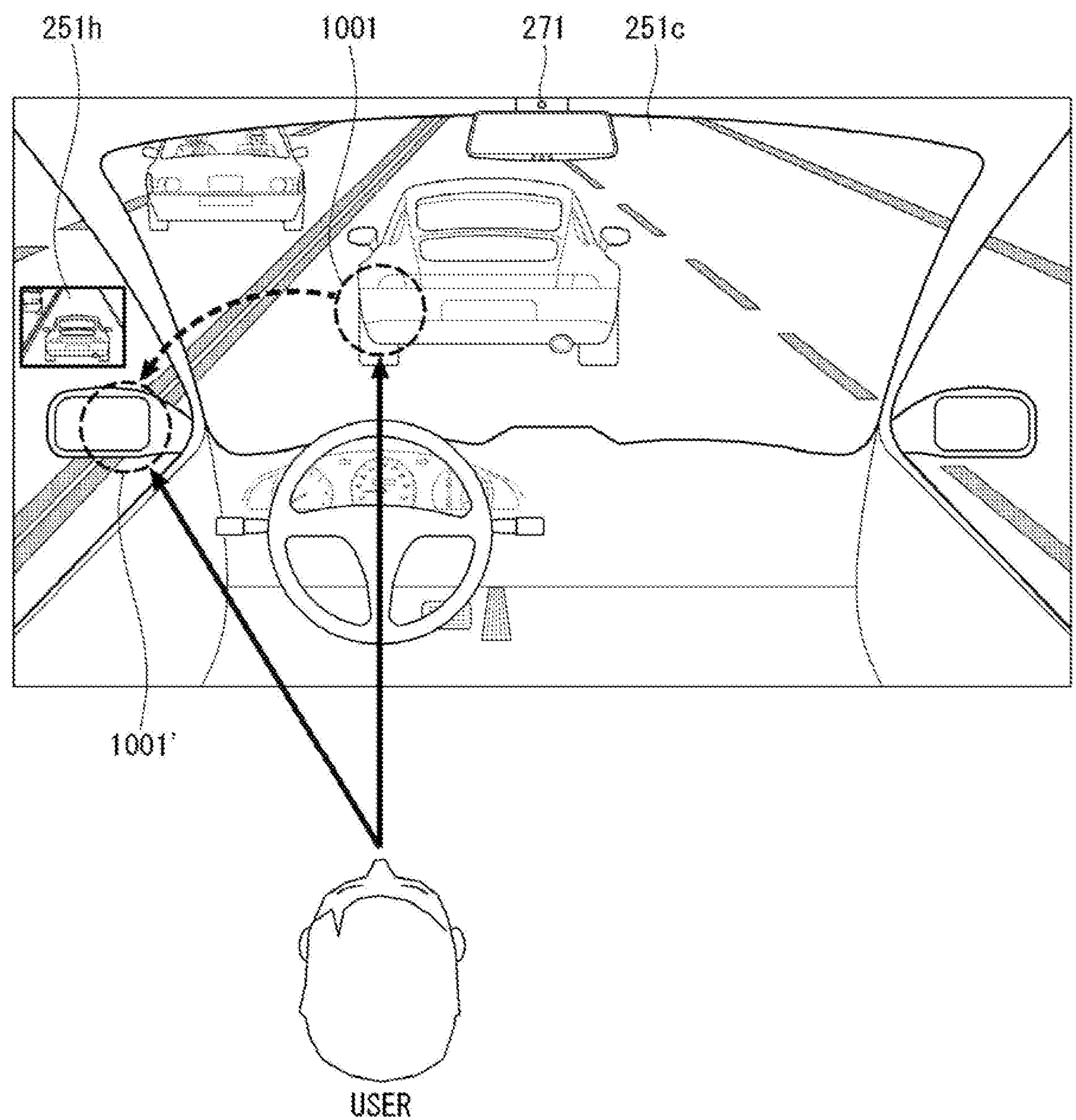

【FIG. 11】
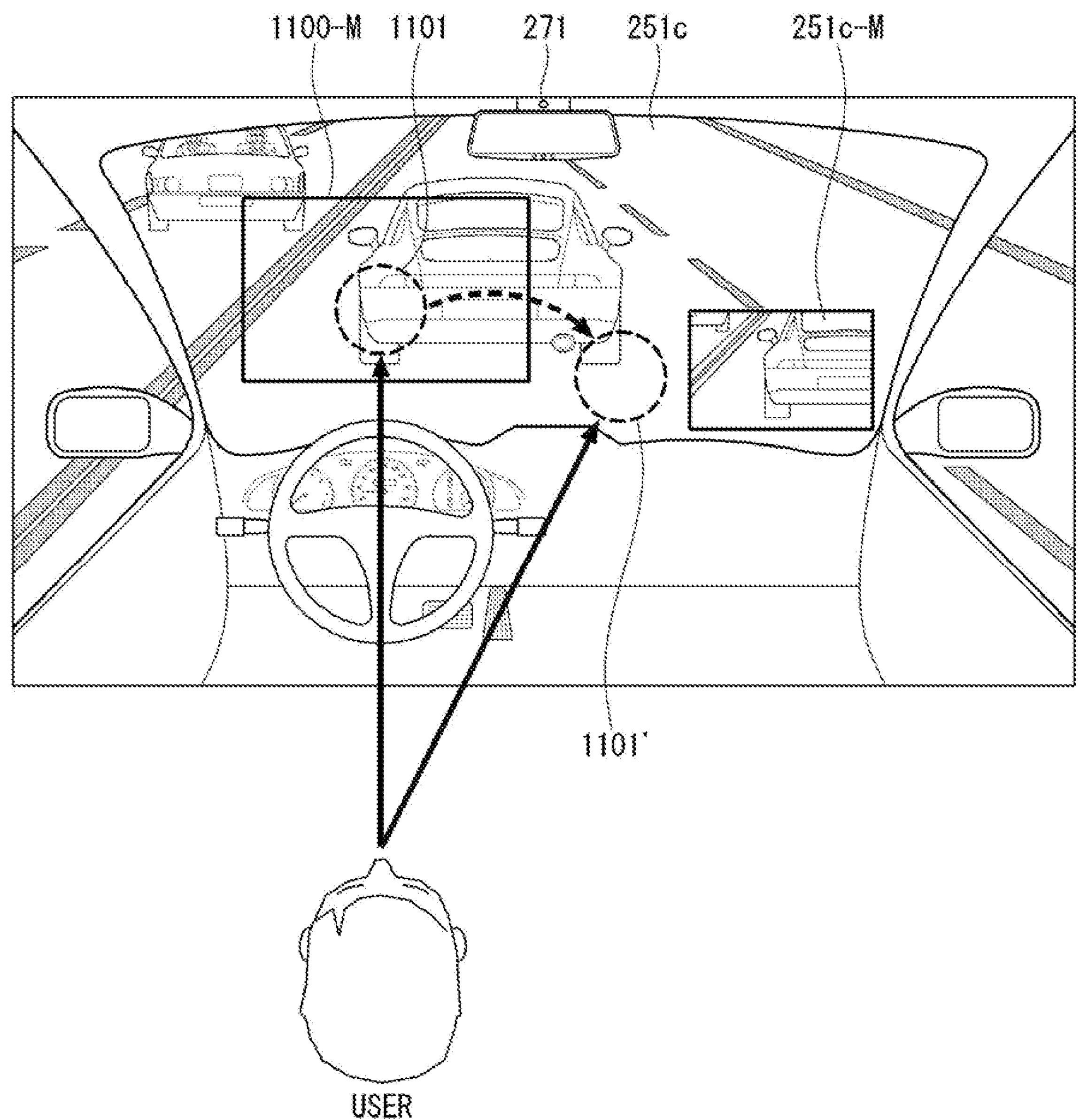

【FIG. 12】
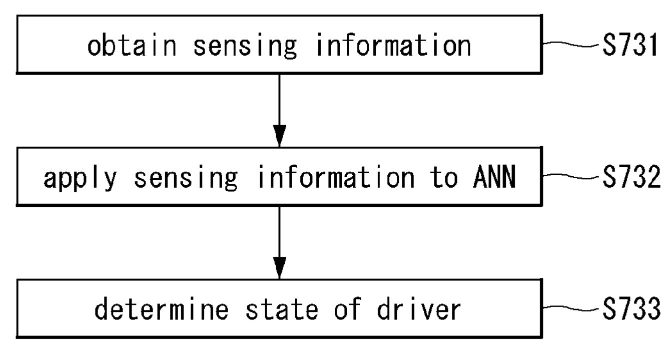

【FIG. 13】
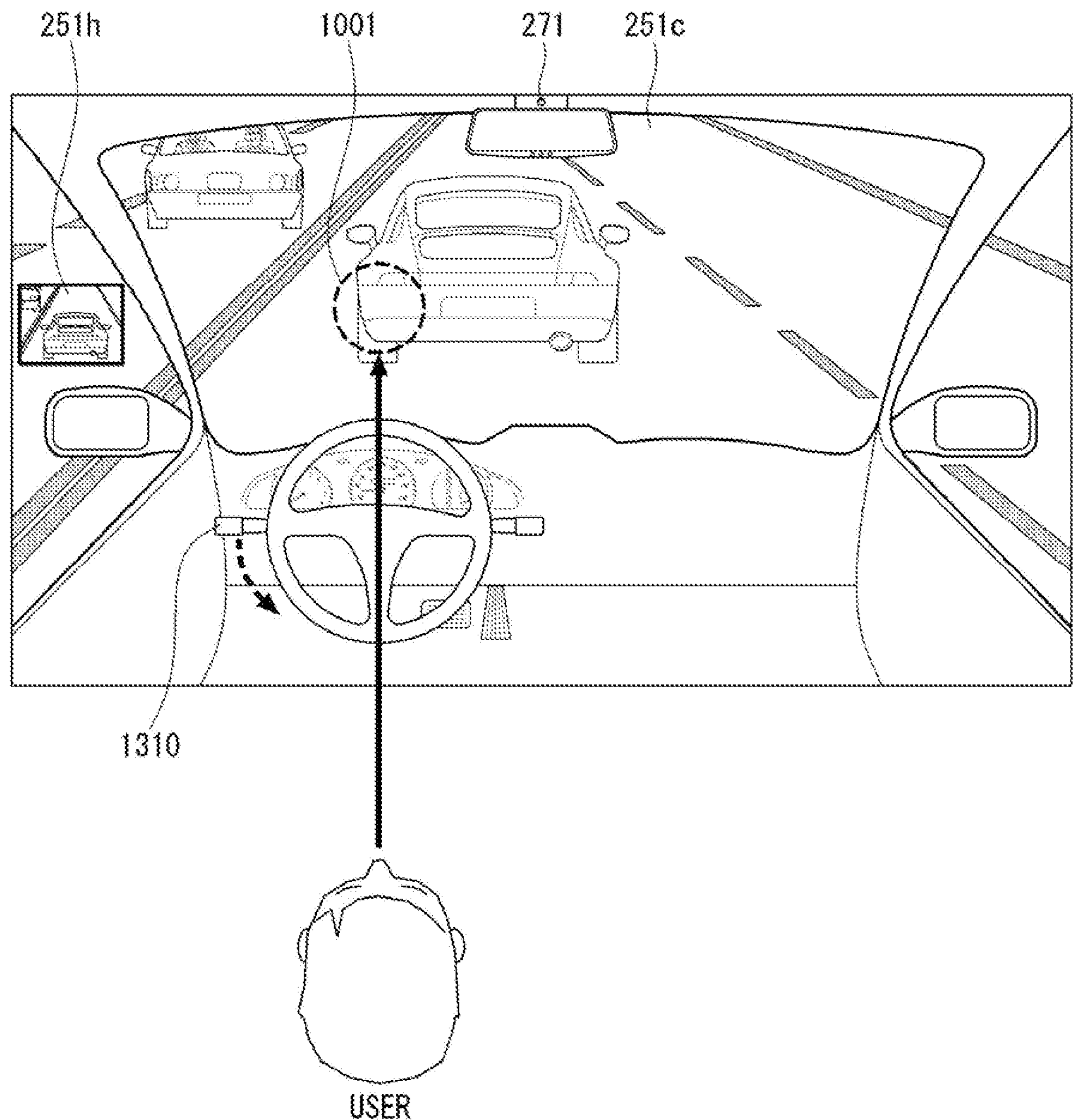

【FIG. 14】
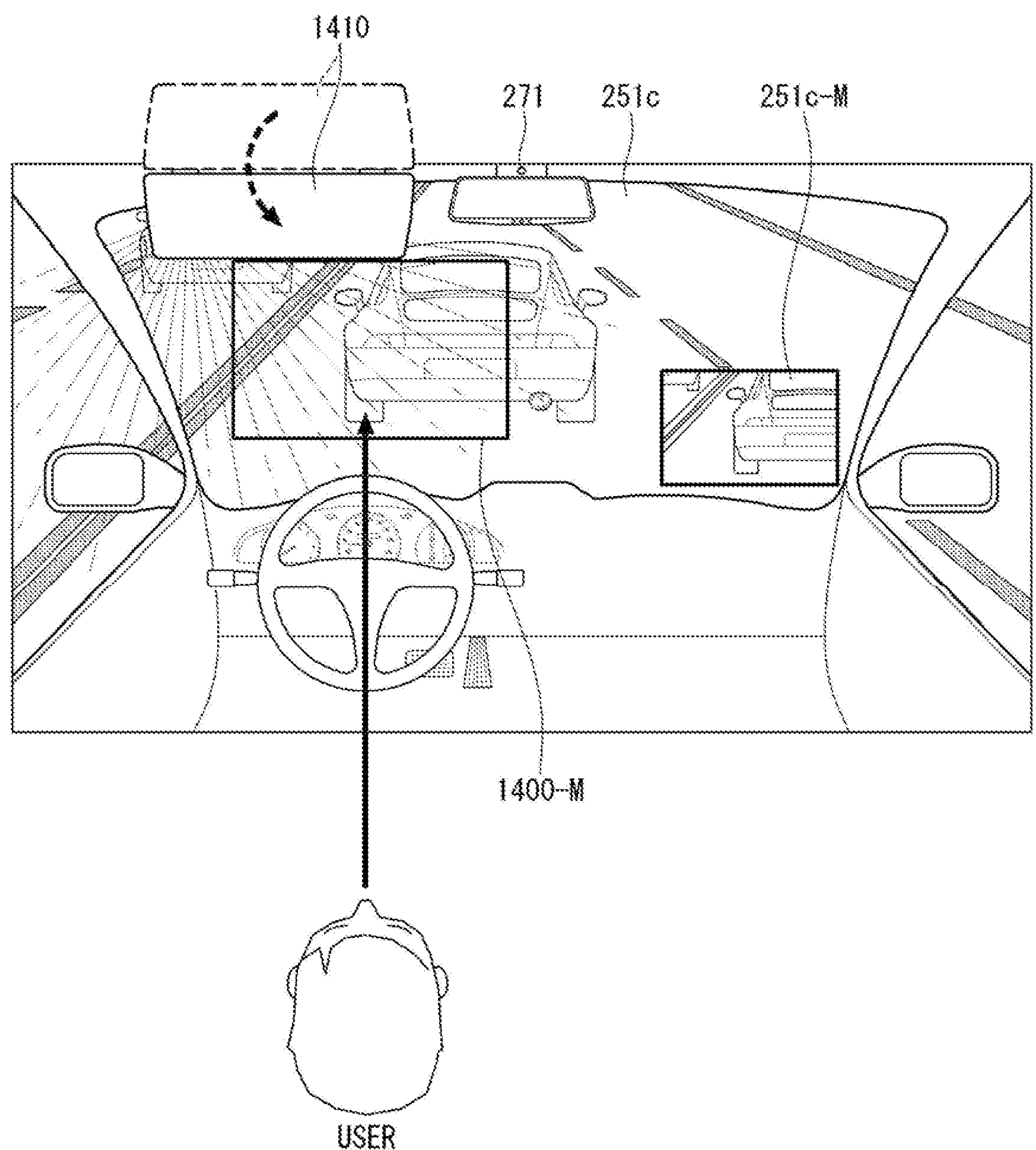

【FIG. 15】
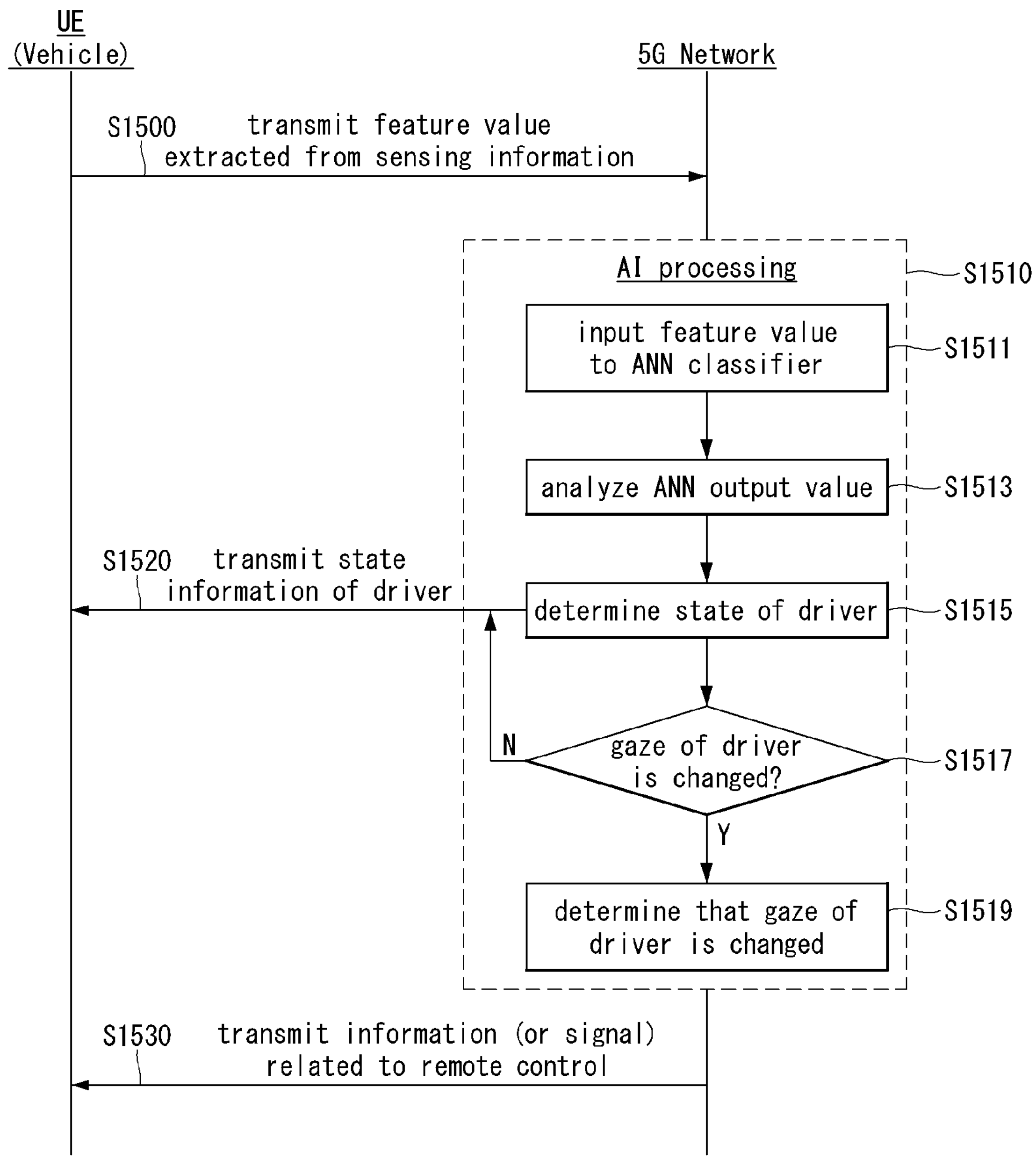

【FIG. 16】
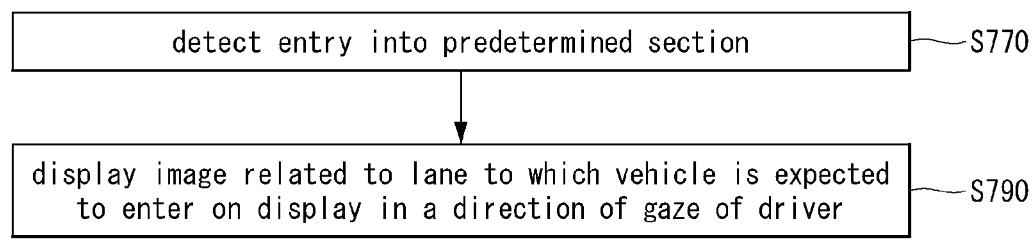

【FIG. 17】
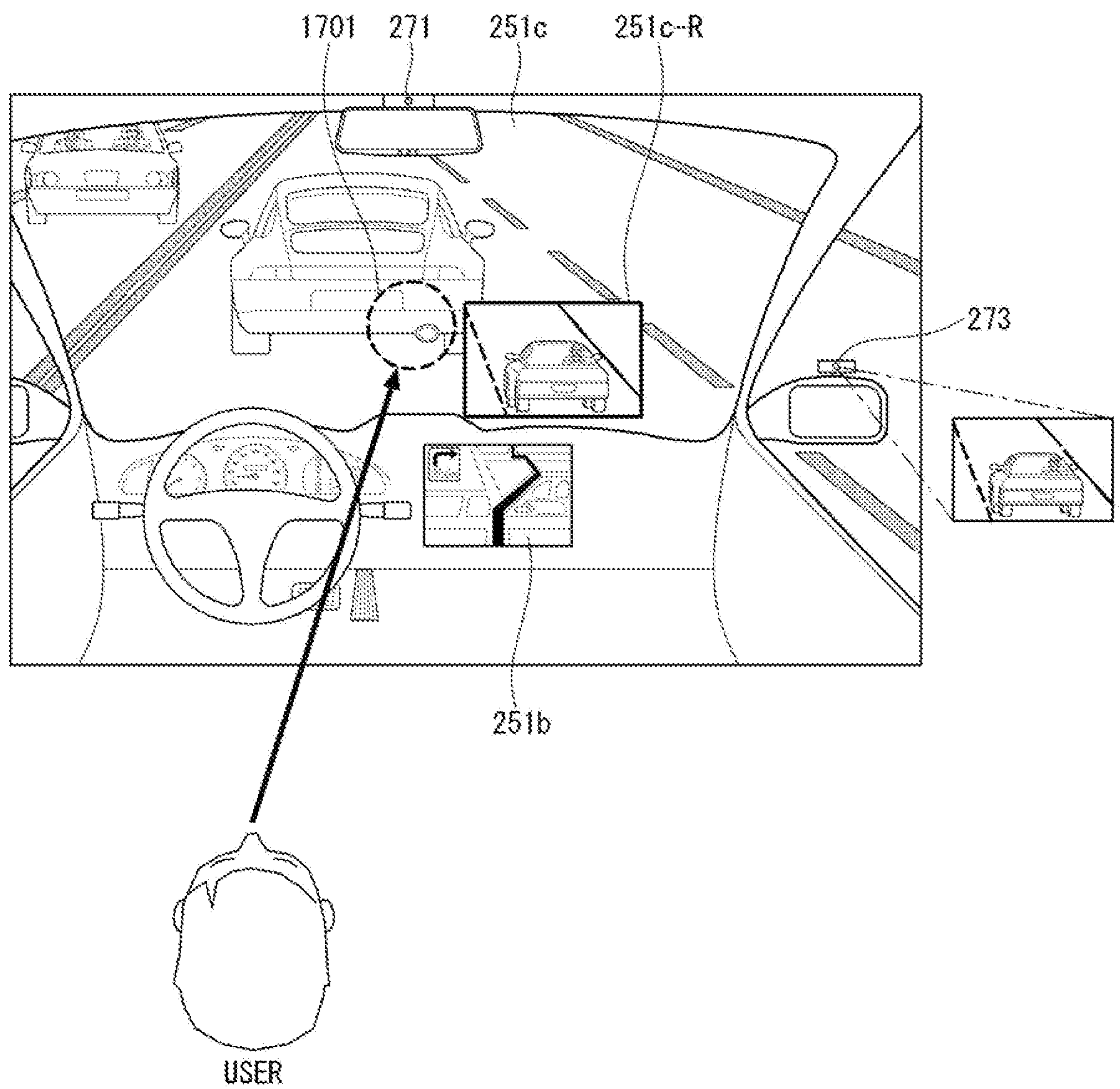

METHOD FOR CONTROLLING VEHICLE AND INTELLIGENT COMPUTING APPARATUS FOR CONTROLLING THE VEHICLE

CROSS-REFERENCE TO RELATED APPLICATION(S)

This application is based on and claims priority under 35 U.S.C. 119 to Korean Patent Application No. 10-2019-0071041, filed on Jun. 14, 2019, in the Korean Intellectual Property Office, the disclosure of which is herein incorporated by reference in its entirety.

BACKGROUND OF THE INVENTION

Field of the Invention

The present disclosure relates to a vehicle control method and an intelligent computing device for controlling a vehicle, and more particularly, to a vehicle control method for reflecting driver's state information and an intelligent computing device for controlling a vehicle.

Description of Related Art

A vehicle is a means of transportation for moving a user therein in a desired direction, and a typical example thereof may be an automobile. While the vehicle provides a user with ease of movement, the user must watch the front and back of the vehicle carefully during driving. Here, the front and back may refer to an object, i.e., a driving obstructing element such as a person, a vehicle, an obstacle, and the like, which is close to the vehicle.

In a related art, a display is disposed on the front of a driver's seat and a driving assistance image is provided by displaying an image of a left side or a right side through the front display. However, in a case where a gaze of a driver is directed to the display in the vehicle rather than to the front, there is no danger prevention element that may be provided to the driver against an obstacle element on the front.

Also, in the related art, when the driver turns his or her gaze to the front from in the left or right, a field of vision on the left or right previously viewed by the driver is not secured.

SUMMARY OF THE INVENTION

The present disclosure aims to address the foregoing issues and/or needs.

Another aspect of the present disclosure may provide a method for controlling a vehicle providing an image assisting a direction of a driver's gaze, and an intelligent computing apparatus controlling a vehicle.

According to an aspect of the present disclosure, a method for controlling vehicle providing an image assisting a gaze of a driver, includes: obtaining action information of the driver; and when a change in the gaze of the driver is recognized, displaying a driving assistance image through a display related to a direction of the gaze of the driver among a plurality of displays, wherein the driving assistance image is an image related to a direction different from the direction of the changed gaze of the driver.

The driving assistance image may include an image related to a direction of the gaze of the driver before being changed.

The obtaining of action information may include detecting sensing information related to an iris of the driver.

The obtaining of action information may include detecting sensing information related to a voice of the driver, and the change in the gaze of the driver is recognized on the basis of the sensing information related to the iris of the driver and the sensing information related to the voice of the driver.

The obtaining of action information may include detecting sensing information related to a gesture of the driver.

The gesture of the driver may include an input related to a turn indicator of the vehicle.

The gesture of the driver may include an input related to a sun visor of the vehicle.

The method may further include: obtaining information related to an expected route of the vehicle, and wherein the change in the gaze of the driver is recognized on the basis of state information of the driver and the expected route of the vehicle.

The displaying of a driving assistance image may include: determining an expected entry lane on the basis of the expected route; and displaying an image related to the expected entry lane.

The method may further include: receiving, from a network, downlink control information, DCI, used for scheduling transmission of sensing information related to the driver obtained from at least one sensor included in the vehicle, wherein the sensing information related to the driver is transmitted to the network on the basis of the DCI.

The method may further include: performing an initial access procedure with the network on the basis of a synchronization signal block, SSB, wherein the sensing information related to the driver is transmitted to the network through a physical uplink shared channel, PUSCH, and the SSB and a demodulation reference signal, DM-RS, of the PUSCH are quasi-co-located, QCL, for a QCL type D.

The method may further include: controlling a communication unit to transmit the sensing information related to the driver to an artificial intelligence, AI, processor included in the network; and controlling the communication unit to receive AI-processed information from the AI processor, wherein the AI-processed information comprises information indicating that the gaze of the driver has been changed or not.

According to another aspect of the present disclosure, an intelligent computing apparatus for controlling a vehicle, includes: a camera included in the vehicle; a plurality of displays; a sensing unit; a processor; and a memory including an instruction executable by the processor, wherein the instruction causes the processor to: obtain action information of the driver, and display a driving assistance image through a display related to a direction of a gaze of the driver, among a plurality of displays, if a change in the gaze of the driver is recognized on the basis of the action information of the driver, and the driving assistance image includes an image related to a direction different from the direction of the changed gaze of the driver The driving assistance image may include an image related to a direction of the gaze of the driver before being changed.

The processor may detect sensing information related to the iris of the driver.

The processor may further detect sensing information related to a voice of the driver, and recognizes a change in the gaze of the driver on the basis of the sensing information related to the iris of the driver and the sensing information related to the voice of the driver.

The processor may detect sensing information related to a gesture of the driver.

The gesture of the driver may include an input related to a turn indicator of the vehicle.

The gesture of the driver may include an input related to a sun visor of the vehicle.

The processor may obtain information related to an expected route of the vehicle, and recognize a change in the gaze of the driver on the basis of state information of the driver and the expected route of the vehicle.

BRIEF DESCRIPTION OF DRAWINGS

The above and other aspects, features, and advantages of the present disclosure will be more clearly understood from the following detailed description taken in conjunction with the accompanying drawings, in which:

FIG. 1 shows a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 is a diagram showing a vehicle according to an embodiment of the present disclosure.

FIG. 5 is a block diagram illustrating an AI device.

FIG. 6 is a diagram illustrating a system in which an autonomous vehicle and an AI device are connected according to an exemplary embodiment of the present disclosure.

FIG. 7 is a flowchart of a vehicle control method according to an embodiment of the present disclosure.

FIG. 8 is a view illustrating a process of displaying a driving assistance image according to a change in a gaze in a direction of the center.

FIG. 9 is a view illustrating a process of displaying a driving assistance image according to a change in a gaze in a forward direction.

FIG. 10 is a view illustrating a process of displaying a driving assistance image according to a change in a gaze in a leftward direction.

FIG. 11 is a view illustrating a process of displaying a driving assistance image according to a change in a gaze from a left area to a right area of a front display.

FIG. 12 is a flowchart illustrating a process of determining a driver's state using an artificial neural network model.

FIG. 13 is a view illustrating a process of displaying a driving assistance image according to an input related to a turn indicator.

FIG. 14 is a view illustrating a process of displaying a driving assistance image according to an input related to a sun visor.

FIG. 15 is a view illustrating an example of determining a driver's state in an embodiment of the present disclosure.

FIG. 16 is a flowchart illustrating a process of displaying a driving assistance image based on state information of a vehicle.

FIG. 17 is a view illustrating the process described with reference to FIG. 16.

DETAILED DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device(AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

The description of the user equipment (UE) in the above description may be applied to the description of the vehicle described with reference to FIGS. 4 to 17.

Hereinafter, a vehicle control method and an intelligent computing device for controlling a vehicle according to an embodiment of the present disclosure will be described in detail with reference to FIGS. 4 to 17.

FIG. 4 is a diagram showing a vehicle according to an embodiment of the present disclosure.

Referring to FIG. 4, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

FIG. 5 is a block diagram illustrating an AI device.

The AI device 20 may include an electronic device including an AI module capable of performing AI processing or a server including the AI module. In addition, the AI device 20 may be included in at least a part of the intelligent service providing apparatus 100 illustrated in FIG. 34 and may be provided to perform at least some of the AI processing together.

The AI processing may include all operations related to the control of the intelligent service providing apparatus 100 illustrated in FIG. 34. For example, the intelligent service providing apparatus 100 may AI process the sensing data or the acquired data to perform processing/determination and control signal generation. In addition, for example, the intelligent service providing apparatus 100 may AI process the data received through the communication unit to perform control of the intelligent electronic device.

The AI device 20 may be a client device that directly uses the AI processing result or may be a device in a cloud environment that provides the AI processing result to another device.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, a tablet PC, and the like.

The AI processor 21 may learn a neural network using a program stored in the memory 25. In particular, the AI processor 21 may learn a neural network for obtaining estimated noise information by analyzing the operating state of each speech providing device. In this case, the neural network for outputting estimated noise information may be designed to simulate the human's brain structure on a computer, and may include a plurality of network nodes having weight and simulating the neurons of the human's neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks(CNN), recurrent neural networks (RNN), a restricted boltzmann machine (RBM), deep belief networks (DBN), and a deep Q-network, and can be applied to fields such as computer vision, speech providing, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by obtaining learning data to be used for learning and by applying the obtained learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data obtaining unit 23 and a model learning unit 24.

The learning data acquisition unit 23 may obtain training data for a neural network model for classifying and recognizing data. For example, the learning data acquisition unit 23 may obtain an operating state to be input to the neural network model and/or a feature value, extracted from the operating state, as the training data.

The model learning unit 24 can perform learning such that a neural network model has a determination reference about how to classify predetermined data, using the obtained learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The training data preprocessor may pre-process an obtained operating state so that the obtained operating state may be used for training for recognizing estimated noise information. For example, the training data preprocessor may process an obtained operating state in a preset format so that the model training unit 24 may use obtained training data for training for recognizing estimated noise information.

Furthermore, the training data selection unit may select data for training among training data obtained by the learning data acquisition unit 23 or training data pre-processed by the preprocessor. The selected training data may be provided to the model training unit 24. For example, the training data selection unit may select only data for a syllable, included in a specific region, as training data by detecting the specific region in the feature values of an operating state obtained by the speech providing device 10.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 6 is a block diagram showing a detailed configuration of the autonomous driving vehicle of FIG. 4.

Referring to FIG. 6, the autonomous driving intelligent service providing apparatus 200 may transmit data required to be subjected to AI processing to an AI device 20 using a communication unit. The AI device 20 including the deep-learning model 26 may transmit the AI processing result using the deep-learning model 26 to the autonomous driving intelligent service providing apparatus 200. The details about the AI device 20 may refer to the description in FIG. 5.

The autonomous driving intelligent service providing apparatus 200 may include a memory 140, a processor 170, and a power supply 190. The processor 170 may further include an autonomous driving module 260 and an AI processor 261. Further, the autonomous driving intelligent service providing apparatus 200 may include an interface that may be connected to at least one electronic device provided in the vehicle in a wired or wireless manner to exchange data necessary for autonomous driving control therewith. The at least one electronic device connected thereto using the interface may include an object detector 210, a communication unit 220, a driving manipulating unit 230, a main ECU 240, a vehicle driver 250, a sensor 270, and a location data generation unit 280.

The interface may comprise at least one of a communication module, a terminal, a pin, a cable, a port, a circuit, an element and a device.

The memory 140 is electrically connected to the processor 170. The memory 140 may store basic data about the unit, control data for controlling the operation of the unit, and data as input/output. The memory 140 may store data processed by the processor 170. The memory 140 may be composed of at least one of ROM, RAM, EPROM, flash drive, and hard drive in hardware. The memory 140 may store various data for operation of the autonomous driving intelligent service providing apparatus 200, such as a program for processing or controlling the processor 170. The memory 140 may be implemented integrally with the processor 170. Depending on the embodiments, the memory 140 may be categorized as a sub-component of the processor 170.

The power supply 190 may power autonomous driving device 10. The power supply 190 may receive power from a power source (e.g., battery) included in the autonomous driving intelligent service providing apparatus 200, and supply the power to each unit of the autonomous driving intelligent service providing apparatus 200. The power supply 190 may be operated according to a control signal provided from the main ECU 240. The power supply 190 may include an SMPS (switched-mode power supply).

The processor 170 may be electrically coupled to the memory 140, interface 280, and power supply 190 to exchange signals therewith. The processor 170 may be implemented using at last one of an ASIC (application specific integrated circuit), DSPs (digital signal processors), DSPs (digital signal processing devices), PLDs (programmable logic devices), FPGAs (field programmable gate arrays), processors, controllers, microcontrollers or microprocessors or the electrical units for execution of the functions.

The processor 170 may be driven by the power provided from a power supply 190. The processor 170 receives data, processes data, generates signals, or supplies signals in a state where the power is supplied thereto from the power supply 190.

The processor 170 may receive information from other electronic devices in the autonomous driving intelligent service providing apparatus 200 using an interface. The processor 170 may provide control signals to the other electronic devices within the autonomous driving intelligent service providing apparatus 200 using the interface.

The autonomous driving intelligent service providing apparatus 200 may include at least one printed circuit board (PCB). The memory 140, interface, power supply 190, and processor 170 may be electrically connected to the printed circuit board.

Hereinafter, other electronic devices and the AI processor 261 and the autonomous driving module 260 in the vehicle as connected to the interface will be described in more detail. Hereinafter, the autonomous driving intelligent service providing apparatus 200 will be referred to as an intelligent service providing apparatus 200 for convenience of explanation.

First, the object detector 210 may generate information about an object outside the intelligent service providing apparatus 200. The AI processor 261 applies a neural network model to the data obtained using the object detector 210. Thus, at least one of the absence or presence of the object, the position information of the object, the distance information between the vehicle and the object, and the relative speed information between the vehicle and the object may be generated by the AI processor 261.

The object detector 210 may include at least one sensor capable of detecting an object outside the intelligent service providing apparatus 200. The sensor may include at least one of a camera, a radar, a lidar, an ultrasonic sensor, and an infrared sensor. The object detector 210 may provide data about the object generated based on the sensing signal as generated by the sensor to at least one electronic device included in the vehicle.

Further, the intelligent service providing apparatus 200 transmits data acquired using the at least one sensor to the AI device 20 using the communication unit 220. The AI device 20 may apply the neural network model 26 to the transmitted data and transmit the generated AI processed data to the intelligent service providing apparatus 200. The intelligent service providing apparatus 200 recognizes information on the detected object based on the received AI processed data. Thus, the autonomous driving module 260 may perform autonomous driving control operations using the recognized information.

The communication unit 220 may exchange signals with devices located outside the intelligent service providing apparatus 200. The communication unit 220 may exchange signals with at least one of an infrastructure (for example, a server, a broadcasting station), another vehicle, or a terminal. The communication unit 220 may include at least one of a transmitting antenna, a receiving antenna, an RF (Radio Frequency) circuit and an RF device capable of implementing various communication protocols to perform communication.

Applying the neural network model to the data obtained using the object detector 210 may result in generating at least one of presence or absence of object, position information of object, distance information of the vehicle and object, and relative speed information between vehicle and object.

The driving manipulating unit 230 is a device that receives a user input for driving. In the manual mode, the intelligent service providing apparatus 200 may be operated based on signals provided by the driving manipulating unit 230. The driving manipulating unit 230 may include a steering input device, for example, a steering wheel, an acceleration input device, for example, an accelerator pedal and a brake input device, for example, a brake pedal.

Further, in the autonomous driving mode, the AI processor 261 may generate an input signal of the driver manipulation unit 230 according to a signal for controlling the vehicle movement according to the driving plan generated using the autonomous driving module 260.

Further, the intelligent service providing apparatus 200 transmits data necessary for controlling the driver manipulation unit 230 to the AI device 20 using the communication unit 220. The AI device 20 may apply the neural network model 26 to the transmitted data and then transmit the generated AI processed data to the intelligent service providing apparatus 200. Thus, the intelligent service providing apparatus 200 may use the input signal of the driver manipulation unit 230 for vehicle motion control based on the received AI processed data.

The main ECU 240 may control the overall operation of the at least one electronic device provided in the intelligent service providing apparatus 200.

The vehicle driver 250 is a device that electrically controls various vehicle driving devices in the intelligent service providing apparatus 200. The vehicle driver 250 may include a powertrain drive control device, a chassis drive control device, a door/window drive control device, a safety device drive control device, a lamp drive control device, and an air conditioning drive control device. The powertrain drive control device may include a power source drive control device and a transmission drive control device. The chassis drive control device may include a steering drive control device, a brake drive control device, and a suspension drive control device. Further, the safety device drive control device may include a seat belt drive control device for seat belt control.

The vehicle driver 250 may include at least one electronic control device, for example, control ECU (Electronic Control Unit).

The vehicle driver 250 may control the power train, the steering device, and the brake device based on signals received from the autonomous driving module 260. The signal received from the autonomous driving module 260 may be a driving control signal generated by applying the neural network model to the vehicle-related data using the AI processor 261. The drive control signal may be a signal received from an external AI device 20 using the communication unit 220.

The sensor 270 may sense the state of the vehicle. The sensor 270 may include at least one of an IMU (inertial measurement unit sensor), a crash sensor, a wheel sensor wheel sensor, a speed sensor, a tilt sensor, a weight sensor, a heading sensor, position module, vehicle forward/reverse sensor, battery sensor, fuel sensor, tire sensor, steering sensor, a temperature sensor, a humidity sensor, an ultrasonic sensor, an illuminance sensor, and a pedal position sensor. Further, the IMU (inertial measurement unit) sensor may include at least one of an acceleration sensor, a gyro sensor, and a magnetic sensor.

The AI processor 261 may generate vehicle state data by applying the neural network model to the sensing data generated by the at least one sensor. The AI processing data generated by applying the neural network model include vehicle orientation data, vehicle motion data, vehicle yaw data, vehicle roll data, vehicle pitch data, vehicle collision data, vehicle direction data, vehicle angle data, vehicle speed data, vehicle acceleration data, vehicle slope data, vehicle forward/backward data, vehicle weight data, battery data, fuel data, tire air pressure data, vehicle internal temperature data, vehicle internal humidity data, steering wheel rotation angle data, vehicle exterior brightness data, pressure data to be applied to the accelerator pedal, and pressure data to be applied to the brake pedal, etc.

The autonomous driving module 260 may generate the driving control signal based on the AI processed state data of the vehicle.

Further, the intelligent service providing apparatus 200 transmits the sensing data obtained using the at least one sensor to the AI device 20 using the communication unit 22. Then, the AI device 20 may apply the neural network model 26 to the transmitted sensing data and then transmit the generated AI processed data to the intelligent service providing apparatus 200.

The location data generation unit 280 may generate location data of the intelligent service providing apparatus 200. The location data generation unit 280 may include at least one of a GPS (Global Positioning System) and a DGPS (Differential Global Positioning System).

The AI processor 261 may generate more precise vehicle position data by applying the neural network model to the position data generated by the at least one position data generation unit.

According to one embodiment, the AI processor 261 performs a deep-learning operation based on at least one of the IMU (Inertial Measurement Unit) of the sensor 270 and the camera image of the object detection device 210. The position data may be corrected by the AI processor based on the generated AI processed data.

Further, the intelligent service providing apparatus 200 transmits position data obtained from the location data generation unit 280 to the AI device 20 using the communication unit 220. Then, the AI device 20 may apply the neural network model 26 to the received position data and then may transmit the generated AI processed data to the intelligent service providing apparatus 200.

The intelligent service providing apparatus 200 may include an internal communication system 50. A plurality of electronic devices included in the intelligent service providing apparatus 200 may exchange signals via the internal communication system 50. The signal may include data. The internal communication system 50 may use at least one communication protocol, for example, CAN, LIN, FlexRay, MOST, Ethernet.

The autonomous driving module 260 generates a path for autonomous driving based on the acquired data and creates a driving plan for traveling along the generated route.

The autonomous driving module 260 may implement at least one ADAS (Advanced Driver Assistance System) function. The ADAS may implement at least one of ACC (Adaptive Cruise Control) system, AEB (Autonomous Emergency Braking) system, FCW (Forward Collision Warning) system, LKA (Lane Keeping Assist) system, LCA (Lane Change Assist) system, TFA (Target Following Assist) system, BSD (Blind Spot Detection) system, HBA (High Beam Assist) system, APS (Auto Parking System) system, PD (collision warning system) system, TSR (Traffic Sign Recognition) system, TSA (Traffic Sign Assist) system, NV (Night Vision) system, DSM (Driver Status Monitoring) system, and TJA (Traffic Jam Assist) system.

The AI processor 261 applies the traffic-related information received from the external device or the at least one sensor included in the vehicle, and the information received from the other vehicle communicating with the vehicle to the neural network model. Thus, a control signal capable of performing at least one of the ADAS functions as described above may be transmitted from the AI processor 261 to the autonomous driving module 260.

Further, the intelligent service providing apparatus 200 transmits at least one data to perform ADAS functions to the AI device 20 using the communication unit 220. The AI device 20 may apply the neural network model 260 to the received data and thus deliver a control signal capable of performing the ADAS function to the intelligent service providing apparatus 200.

The autonomous driving module 260 may obtain driver status information and/or vehicle status information from the AI processor 261 and perform the switching operation from the autonomous driving mode to the manual driving mode or the switching from the manual driving mode to the autonomous driving mode based on the driver status information and/or vehicle status information.

Further, the intelligent service providing apparatus 200 may utilize

AI processed data for passenger support to execute driving control. For example, as described above, the intelligent service providing apparatus 200 may use the at least one sensor provided inside the vehicle to check the status of the driver and the passenger.

Alternatively, the intelligent service providing apparatus 200 may use the AI processor 261 to recognize the voice signal of the driver or occupant, and to perform a voice processing operation and to execute the speech synthesis operation.

In the above, the outlines for performing AI processing by applying the 5G communication and the 5G communication necessary to implement the vehicle control method according to an embodiment of the present disclosure, and transmitting and receiving the AI processing result.

Hereinafter, a specific method of providing an image for assisting a gaze of a driver on the basis of the information related to a change in the gaze of the driver according to an embodiment of the present disclosure will be described with reference to necessary drawings.

FIG. 7 is a flowchart of a vehicle control method according to an embodiment of the present disclosure.

A vehicle control method according to an embodiment of the present disclosure may be implemented in a vehicle including the functions described above with reference to FIGS. 1 to 6 or an intelligent computing apparatus that controls the vehicle. More specifically, the vehicle control method according to an embodiment of the present disclosure may be implemented in the vehicle 10 described in FIGS. 4 and 6.

First, the vehicle 10 may obtain action information (or behavior information) of the driver (S710).

The vehicle 10 may obtain the action information of the driver using sensing data obtained by the sensing unit 270 described above with reference to FIG. 6. For example, the sensing unit 270 may include at least one camera (not shown), and the at least one camera (not shown) in the vehicle may obtain sensing data related to a movement of the driver's iris and a movement of the driver's body. The vehicle 10 may obtain gaze information of the driver and gesture information of the driver using the sensing data.

Next, the vehicle 10 may determine whether the gaze of the driver is changed (S730).

For example, the vehicle 10 may determine whether the gaze of the driver is changed on the basis of the action information of the driver (gaze of the driver, gesture of the driver). For example, when the gaze of the driver is changed from a first direction to the second direction, the vehicle 10 may determine that the gaze of the driver has been changed. Conversely, when the gaze of the driver is moved by a predetermined threshold or less in the first direction, the vehicle 10 may determine that the gaze of the driver has not been changed. When the gaze of the driver is changed from the first direction to a direction in which the other user is located in the vehicle and a voice signal with the other user in the vehicle is obtained, the vehicle 10 may determine that the gaze of the user has not been changed. In another example, when the driver makes a gesture to lower the sun visor, the vehicle 10 may determine that the gaze of the driver has been changed from a front direction in which the sun visor is located to a right direction. As another example, when the driver makes a gesture to raise the sun visor, the vehicle 10 may determine that the gaze of the driver has been changed from another direction to the front direction in which the sun visor is located. As another example, when the driver inputs a left turn indicator or a right turn indicator, the vehicle 10 may determine that the gaze of the driver has been changed to the left direction or the right direction.

If it is determined that the gaze of the driver has not been changed, the vehicle 10 continues to update the driver's action information (S710).

If it is determined that the gaze of the driver has been changed, the vehicle 10 may display an image related to a gaze direction before the change in a display area located in a gaze direction after the change (S750).

For example, when it is determined that the gaze of the driver has been changed to the front direction from the left or the right, the vehicle 10 may display an auxiliary image related to the left or right which is a direction before the change in the gaze on a front display (not shown). Conversely, when it is determined that the gaze of the driver has been changed from the front to the left or right, the vehicle 10 may display an auxiliary image related to the front which is a direction before the change in the size on a display located on the left or right.

FIG. 8 is a view illustrating a process of displaying a driving assistance image according to a change in a gaze to a center direction.

As shown in FIG. 8, the vehicle 10 may drive the vehicle 10 on the basis of an operation of the driver with respect to a brake 570 and an excel 530 under the control of the processor 170. The vehicle 10 may include a plurality of displays 251*a*, 2521*b*, 251*c*, and 251*h* in the vehicle.

In the case of FIG. 8, the front display 251*c* may display a front direction image captured by the camera 271 of the vehicle 10 under the control of the processor 170. A left display 251*h* may display a left rear image captured by a camera (not shown) adjacent to the left display under the control of the processor 170.

In particular, a center display 251*b* may display a left rear image and a right rear image under the control of the processor 170. Specifically, a left area 251-L of the center display 251*b* may display the left rear image under the control of the processor 170, and a right area 251-R of the center display 251*b* may display the right rear image under the control of the processor 170.

According to an embodiment of the present disclosure, the front camera 271 may capture an image of an iris of the driver USER under the control of the processor 170 to detect a gaze of the driver. The processor 170 may determine that the gaze of the driver is changed from a first direction 801 (front direction) to a second direction 801' (direction in which the left area 251*b*-L of the center display 251*b* is located) using the detected gaze data of the driver.

When it is determined that the gaze of the driver is changed from the first direction 801 to the second direction 801', the processor 170 may display a front image related to the gaze direction before the change, instead of the currently displayed right rear image, on the right area 251*b*-R, while displaying the left rear image which has been displayed in the left area 251*b*-L of the center display 251*b* located in the second direction 801'.

Thus, even if the gaze of the driver is changed from the front direction to the direction in which the center display is located, information on a driving obstructing element that may exist on a front side of the vehicle 10 may be continuously provided to the driver by continuously providing the driver with the image related to the front direction.

FIG. 9 is a view illustrating a process of displaying a driving assistance image according to a change in a gaze in the front direction.

In the case of FIG. 9, the processor 170 may determine that the gaze of the driver is changed from a first direction 901 (left direction) to a second direction 901' (central area of the front display 251*c*) using gaze data of the driver detected by the front camera 271.

When it is determined that the gaze of the driver is changed from the first direction 901 to the second direction 901', the processor 170 may display a left rear image related to the first direction (left direction) which is a direction of the gaze before the change captured by the left camera 272, in an adjacent area (adjacent area such as left/right/upper end/lower end side, etc.) 251*c*-H of the center area of the front display 251*c* located in the second direction 901'.

Thus, even if the gaze of the driver is changed from the left direction to the direction in which the front display is located, information related to a driving obstructing element that may appear on the left of the vehicle 10 may be continuously provided to the driver by continuously providing the driver with the image related to the left rear direction.

FIG. 10 is a view illustrating a process of displaying a driving assistance image according to a change in a gaze in the left direction.

In the case of FIG. 10, the processor 170 may determine that a gaze of the driver is changed from a first direction 1001 (front direction) to a second direction 1001' (left direction) using gaze data of the driver detected by the front camera 271.

When it is determined that the gaze of the driver is changed from the first direction 1001 (front direction) to the second direction 1001' (left direction), the processor 170 may display a front image related to the first direction (front direction) which is a direction of the gaze before the change captured by the front camera 271, on the left display 251*h* located in the second direction 1001'.

Thus, even if the gaze of the driver is changed from the front direction to the direction in which a side display is located, information on a driving obstructing element that may appear on the front side of the vehicle 10 may be continuously provided to the driver by continuously providing the driver with the image related to the front direction.

FIG. 11 is a view illustrating a process of displaying a driving assistance image according to a change in a gaze from a left area to a right area of the front display.

In the case of FIG. 11, the processor 170 may determine that a gaze of the driver is changed from a first direction 1101 (left area direction of the front display) to a second direction 1101' (right area direction of the front display) using gaze data of the driver detected by the front camera 271.

When it is determined that the gaze of the driver is changed from the first direction 1101 (left area direction of the front display) to the second direction 1101' (right area direction of the front display), the processor 170 may display a front image 1100-M related to the first direction (left direction of the front display) which is a direction of a gaze before the change, in a right area 251*c*-M of the front display 251*c* adjacent to the second direction 1101'.

As a result, even if the gaze of the driver is changed from the left area direction of the front display to the right area direction of the front display due to a driving obstructing element (sunlight) that appears in the left area direction of the front display, information on the driving obstructing element that may appear in the left area of the front display of the vehicle 10 may be continuously provided to the driver by providing the driver with the image related to the left area direction of the front display.

FIG. 12 is a flowchart illustrating a process of determining a driver's state using an artificial neural network model.

As illustrated in FIG. 12, according to an embodiment of the present disclosure, in relation to step S730 of FIG. 7 (determining whether a gaze of the driver is changed), the processor 170 of the vehicle 10 may obtain sensing information (or sensing data) related to the driver using a sensing unit (e.g., at least one camera) in the vehicle. For example, the processor 170 may obtain sensing information related to the driver by controlling at least one camera.

Thereafter, the processor 170 may apply (input) the obtained sensing information to the artificial neural network (ANN) model. The ANN model may be stored in the vehicle 10 or the AI device 20. The ANN model may be learned in advance by the vehicle 10 or the AI device 20 and may be learned to output the driver's state information (AI processing data) when the sensing information is input. Also, the ANN model may be learned in advance by the vehicle 10 or the AI device 20 and may be learned to output whether a gaze of the driver is changed (AI processing data) when the sensing information is input.

For example, when the driver makes a gesture to lower the sun visor or when the driver lowers or raises a turn indicator, the processor 170 may apply the sensing information to the ANN model, and the ANN model may classify whether the gaze of the driver is changed when the driver's gesture to lower the sun visor or move the turn indicator is input. In another example, when the sensing unit senses that the sun visor is lowered or raised or that the turn indicator is lowered or raised, the processor 170 may apply sensing information to the ANN model, and the ANN model may output information indicating that the driver lowered the sun visor and information indicating that the driver moved the turn indicator upon receiving the sensing information.

Accordingly, the processor 170 may determine the driver's state using the AI processing data output from the ANN model (S733).

FIG. 13 is a view illustrating a process of displaying a driving assistance image according to an input with respect to a turn indicator.

According to an embodiment of the present disclosure, the processor 170 of the vehicle 10 may obtain an input of the driver who lowers the turn indicator in a state in which a gaze of the driver faces in the front direction, and apply the input of the driver with respect to the turn indicator to the ANN model.

In the case of FIG. 13, by applying the sensing information related to the gaze of the driver in the front direction and the sensing information related to the driver's input to lower the turn indicator to the ANN model, the processor 170 may obtain, from the ANN model, information indicating that the gaze of the driver has been changed from the front direction to the left direction. In addition, the processor 170 may obtain information indicating that the gaze of the driver has been changed to the left direction from the ANN model, and may determine that the gaze of the driver has been changed from the front direction to the left direction on the basis of the obtained information.

When the information indicating that the gaze of the driver has been changed to the left direction, the processor 170 may display a front image related to the front direction which is a direction of the gaze before the change captured by the front camera 271, on the left display **251*h*** located in the left direction.

FIG. 14 is a view illustrating a process of displaying a driving assistance image according to an input with respect to a sun visor.

According to an embodiment of the present disclosure, in a state in which the gaze of the driver faces in the front direction, the processor 170 of the vehicle 10 may obtain the input of the driver who lowers the sun visor 1410 downward and apply the input of the driver with respect to the sun visor 1410 to the ANN model.

In the case of FIG. 14, by applying the sensing information related to the gaze of the driver in the front direction and the sensing information related to the input of the driver lowering the sun visor 1410 to the ANN model, the processor 170 may obtain information that the gaze of the driver has been changed from the left area direction of the front display to the right area direction of the front display from the ANN model. Further, the processor 170 may obtain information that the gaze of the driver has been changed to the right direction from the ANN model, and based on this, the processor 170 may determine that the gaze of the driver is changed from the left area direction to the right area of the front display **251*c***.

When the information that the gaze of the driver has been changed from the left direction to the right direction of the front display is obtained, the processor 170 may display a driving assistance image 1400-M related to the left area direction which is a direction before the change captured by the front camera 271, in the right area **251*c*-M of the front display 251*c***.

FIG. 15 is a view illustrating an example of determining a driver's state in an embodiment of the present disclosure.

In the meantime, FIG. 15 shows an example in which an operation of identifying a gaze of the driver through the AI processing is implemented in the processing of the vehicle 10, but the present disclosure is not limited thereto. For example, the AI processing may also be performed on a 5G network on the basis of sensing information received from the vehicle 10.

The processor 170 may control the communication unit to transmit the sensing information to the AI processor included in the 5G network. In addition, the processor 170 may control the communication unit to receive AI-processed information (driver's state information or control signal) from the AI processor.

The AI-processed information may be information indicating whether the gaze of the driver has been changed or information indicating that the gaze of the driver has not been changed.

Meanwhile, the vehicle 10 may perform an initial access procedure with the 5G network in order to transmit the sensing information to the 5G network. The vehicle 10 may perform the initial access procedure with the 5G network on the basis of a synchronization signal block, SSB.

Also, the vehicle 10 receives downlink control information (DCI) used for scheduling transmission of the sensing information obtained from at least one sensor included in the vehicle through a wireless communication unit from the network.

The processor 170 may transmit the sensing information to the network on the basis of the DCI.

The sensing information may be transmitted to the network through a PUSCH, and SSB and a demodulation reference signal, DM-RS, of the PUSCH may be quasi-co-located, QCL, for a QCL type D.

Referring to FIG. 15, the vehicle 10 may transmit a feature value extracted from the sensing information to the 5G network (S1500).

Here, the 5G network may include an AI processor or AI system, and the AI system of the 5G network may perform AI processing on the basis of the received sensing information (S1510).

The AI system may input feature values received from the vehicle 10 to the ANN classifier (S1511). The AI system may analyze an ANN output value (S1513) and determine the driver's state from the ANN output value (S1515). The 5G network may transmit state information of the driver determined by the AI system to the vehicle 10 through the wireless communication unit (S1520).

Here, the driver's state information may include information determined as one of information indicating that the gaze of the driver has been changed or information indicating that the gaze of the driver has not been changed.

When it is determined that the gaze of the driver has been changed (S1517), the AI system may determine that the gaze of the driver has been changed (S1519) and transmit, to the vehicle 10, information (or signal) related to remote control to display a driving assistance image in a direction of the gaze of the driver after the change according to the change in the size of the driver (S1530).

After it is determined that the gaze of the driver has not been changed or after step S1515, the AI system may transmit state information of the driver to the vehicle 10 (S1520).

Meanwhile, the vehicle 10 may transmit only the sensing information to the 5G network and extract a feature value corresponding to sensing information to be used as an input of the artificial neural network for determining gaze information of the driver from the sensing information in the AI system included in the 5G network.

FIG. 16 is a flowchart illustrating a process of displaying a driving assistance image on the basis of state information of a vehicle.

As shown in FIG. 16, the processor 170 may detect that the vehicle 10 enters a predetermined section (or a predetermined area) (S770).

For example, the processor 170 may detect that the vehicle 10 has entered the predetermined section on the basis of position data of the vehicle 10 detected by the sensing unit 270.

Subsequently, the processor 170 may determine an entry expected lane of the vehicle 10. For example, the processor 170 may read past driving history of the vehicle 10 from the memory and determine a lane that the current vehicle 10 is expected to enter on the basis of the past driving history. As another example, the processor 170 may execute a navigation application and determine a lane that the current vehicle 10 is expected to enter according to a route guided in the navigation application.

In addition, the processor 170 may detect a direction of a gaze of the driver using at least one camera in the vehicle.

The processor 170 may display an image related to the lane that the vehicle is expected to enter (e.g., a captured image of the lane that the vehicle is expected to enter) on the display in the direction of the gaze of the driver (S790).

FIG. 17 is a view illustrating the process described in FIG. 16.

As shown in FIG. 17, the processor 170 may execute the navigation application and display a navigation screen on the center display 251*b*. The navigation screen may display text "Turn right 350 meters ahead" according to a predetermined route. That is, on the basis of the predetermined route, the processor 170 may determine that the lane that the vehicle 10 is expected to enter is a right lane of the current lane.

After determining that the lane that the vehicle is expected to enter is the right lane, the processor 170 may determine that the gaze of the driver detected by the front camera 271 faces in the front direction 1701 in which the front display 251*c* is located, and display an image of the right lane captured by the right camera 273 on the front display 251*c* located in the front direction.

Similarly to the case of FIG. 17, the processor 170 may obtain the past driving history of the vehicle 10 and determine a predicted route of "Turn right 350 meters ahead" on the basis of the driving history. That is, on the basis of the estimated route determined according to the past driving history, the processor 170 may determine that the lane that the vehicle 10 is expected to enter is the right lane of the current lane.

After determining that the lane that the vehicle 10 is expected to enter is the right lane, the processor 170 may determine that the gaze of the driver detected by the front camera 271 faces a front direction 1701 in which the front display 251*c* is located, and display an image of the right lane captured by the right camera 273 on the front display 251*c* located in the front direction.

The effectiveness of the method of controlling the vehicle and the of intelligent computing devices under this disclosure is as follows.

In the present disclosure, when a direction of a gaze of a driver is changed, a driving assisting image related to a direction of a gaze before being changed is provided to the direction of the current gaze, whereby the driver's driving can be effectively assisted to provide abundant information related to a driving obstructing element.

Further, according to the present disclosure, a behavior pattern of the driver is analyzed, and if it is determined that a gaze of the driver has been changed, a driving assisting image related to a direction of the gaze before being changed is displayed in a partial region of the display in the direction of the current gaze, whereby the driver can easily observe information related to a driving obstructing element.

The effect of the present disclosure is not limited to the above-described effects and the other effects will be understood by those skilled in the art from the following description.

The present disclosure described above may be implemented as a computer-readable code in a medium in which a program is recorded. The computer-readable medium includes any type of recording device in which data that may be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

What is claimed is:

1. A method for controlling vehicle providing an image assisting a gaze of a driver, the method comprising:
obtaining action information of the driver; and
in response to recognizing a change in the gaze of the driver corresponding to a changed gaze based on the action information, selecting a first display among a plurality of displays in the vehicle that is related to a direction of the changed gaze and displaying a driving assistance image on the first display,
wherein the driving assistance image corresponds to a different direction than the changed gaze.

2. The method of claim 1, wherein
the driving assistance image corresponds to a direction of the gaze before the driver switched to the changed gaze.

3. The method of claim 1, wherein
the obtaining of action information comprises detecting sensing information related to an iris of the driver.

4. The method of claim 3, wherein:
the obtaining of action information comprises detecting sensing information related to a voice of the driver, and
the change in the gaze of the driver is recognized based on the sensing information related to the iris of the driver and the sensing information related to the voice of the driver.

5. The method of claim 1, wherein
the obtaining of action information comprises detecting sensing information related to a gesture of the driver.

6. The method of claim 5, wherein
the gesture of the driver includes an input related to a turn indicator of the vehicle.

7. The method of claim 5, wherein
the gesture of the driver includes an input related to a sun visor of the vehicle.

8. The method of claim 1, further comprising:
obtaining information related to an expected route of the vehicle, and
wherein the change in the gaze of the driver is recognized based on state information of the driver and the information related to the expected route of the vehicle.

9. The method of claim 8, wherein
the displaying of the driving assistance image comprises:
determining an expected entry lane based on the information related to the expected route; and
displaying an image related to the expected entry lane.

10. The method of claim 1, further comprising:
receiving, from a network, downlink control information (DCI), used for scheduling transmission of sensing information related to the driver obtained from at least one sensor included in the vehicle,
wherein the sensing information related to the driver is transmitted to the network based on the DCI.

11. The method of claim 10, further comprising:
performing an initial access procedure with the network based on a synchronization signal block (SSB),
wherein the sensing information related to the driver is transmitted to the network through a physical uplink shared channel (PUSCH), and
the SSB and a demodulation reference signal (DM-RS), of the PUSCH are quasi-co-located (QCL), for a QCL type D.

12. The method of claim 10, further comprising:
controlling a transceiver to transmit the sensing information related to the driver to an artificial intelligence (AI) processor included in the network; and
controlling the transceiver to receive AI-processed information from the AI processor,
wherein the AI-processed information comprises information indicating whether the gaze of the driver has been changed or not.

13. An intelligent computing apparatus for controlling a vehicle, the intelligent computing apparatus comprising:
a camera included in the vehicle;
a plurality of displays;
a sensor;
a processor; and
a memory including one or more instructions executable by the processor,
wherein the one or more instructions are configured to cause the processor to:
obtain action information of a driver of the vehicle, and
in response to recognizing a change in a gaze of the driver corresponding to a changed gaze based on the action information, select a first display among the plurality of displays in the vehicle that is related to a direction of the changed gaze and display a driving assistance image on the first display,
wherein the driving assistance image corresponds to a different direction than the changed gaze.

14. The intelligent computing apparatus of claim 13, wherein
the driving assistance image corresponds to a direction of the gaze before the driver switched to the changed gaze.

15. The intelligent computing apparatus of claim 13, wherein
the processor detects sensing information related to the iris of the driver.

16. The intelligent computing apparatus of claim 15 wherein
the processor further detects sensing information related to a voice of the driver, and
recognizes the change in the gaze of the driver based on the sensing information related to the iris of the driver and the sensing information related to the voice of the driver.

17. The intelligent computing apparatus of claim 13, wherein
the processor detects sensing information related to a gesture of the driver.

18. The intelligent computing apparatus of claim 17, wherein
the gesture of the driver includes an input related to a turn indicator of the vehicle.

19. The intelligent computing apparatus of claim 17, wherein
the gesture of the driver includes an input related to a sun visor of the vehicle.

20. The intelligent computing apparatus of claim 13, wherein
the processor obtains information related to an expected route of the vehicle, and recognizes the in the gaze of the driver based on state information of the driver and the information related to the expected route of the vehicle.

* * * * *